US007286554B2

United States Patent
Beckmann et al.

(10) Patent No.: US 7,286,554 B2
(45) Date of Patent: Oct. 23, 2007

(54) METHOD FOR TRANSMITTING AT LEAST ONE GROUP MESSAGE, ASSOCIATED RADIO COMMUNICATION NETWORK, SUBSYSTEM AND MOBILE COMMUNICATION DEVICE

(75) Inventors: Mark Beckmann, Braunschweig (DE); Michael Eckert, Braunschweig (DE); Frank Mademann, Berlin (DE)

(73) Assignee: Siemens Aktiengesellschaft, Muenchen (DE)

( * ) Notice: Subject to any disclaimer, the term of this patent is extended or adjusted under 35 U.S.C. 154(b) by 429 days.

(21) Appl. No.: 10/514,794

(22) PCT Filed: Apr. 30, 2003

(86) PCT No.: PCT/DE03/01399

§ 371 (c)(1),
(2), (4) Date: Feb. 10, 2005

(87) PCT Pub. No.: WO03/094552

PCT Pub. Date: Nov. 13, 2003

(65) Prior Publication Data

US 2005/0141538 A1 Jun. 30, 2005

(30) Foreign Application Priority Data

May 6, 2002 (DE) ............................ 102 20 184

(51) Int. Cl.
*H04J 3/26* (2006.01)
(52) U.S. Cl. .................... 370/432; 370/390; 455/503
(58) Field of Classification Search .............. 370/392, 370/390, 312, 329, 328, 318, 252, 337, 338, 370/336, 432, 335; 455/522, 464, 414.1, 455/486.1, 404.2, 503, 519, 449, 466, 445, 455/509
See application file for complete search history.

(56) References Cited

U.S. PATENT DOCUMENTS

| 5,530,914 | A | 6/1996 | McPheters | |
|---|---|---|---|---|
| 5,640,443 | A | 6/1997 | Kamura | |
| 7,184,790 | B2* | 2/2007 | Dorenbosch et al. | 455/519 |
| 2004/0057387 | A1* | 3/2004 | Yi et al. | 370/252 |
| 2004/0087320 | A1* | 5/2004 | Kim et al. | 455/458 |
| 2004/0131026 | A1* | 7/2004 | Kim et al. | 370/328 |
| 2006/0092901 | A1* | 5/2006 | Parantainen | 370/342 |
| 2006/0146858 | A1* | 7/2006 | Kim | 370/432 |
| 2006/0171369 | A1* | 8/2006 | Ostrup et al. | 370/349 |
| 2007/0086443 | A1* | 4/2007 | Zhang et al. | 370/352 |

FOREIGN PATENT DOCUMENTS

| WO | WO 98/25422 | 6/1998 |
|---|---|---|
| WO | WO 01/39443 | 5/2001 |
| WO | WO 01/43479 | 6/2001 |

OTHER PUBLICATIONS

3GPP TR 23.846—XP-002231206—3rd Generation Partnership Project; Technical Specification Group Services and System Aspects; Multimedia Broadcast/Multicast Service; Architecture and Functional Description (Release 5), Apr. 2002.
ETSI TS 122 146-XP—002255069—Universal Mobile Telecommunications System (UMTS); Multimedia Broadcast/Multicast Service (MBMS); Stage 1, Mar. 2002.

* cited by examiner

*Primary Examiner*—Pablo N. Tran
(74) *Attorney, Agent, or Firm*—Bell, Boyd & Lloyd LLP

(57) ABSTRACT

In order to transmit at least one group message to at least one group consisting of one or more subscriber devices of a radio communications network, the respectively assigned, higher order radio network control unit specifically controls whether and/or how many subscriber devices per radio cell are currently registered with the respective group.

12 Claims, 3 Drawing Sheets

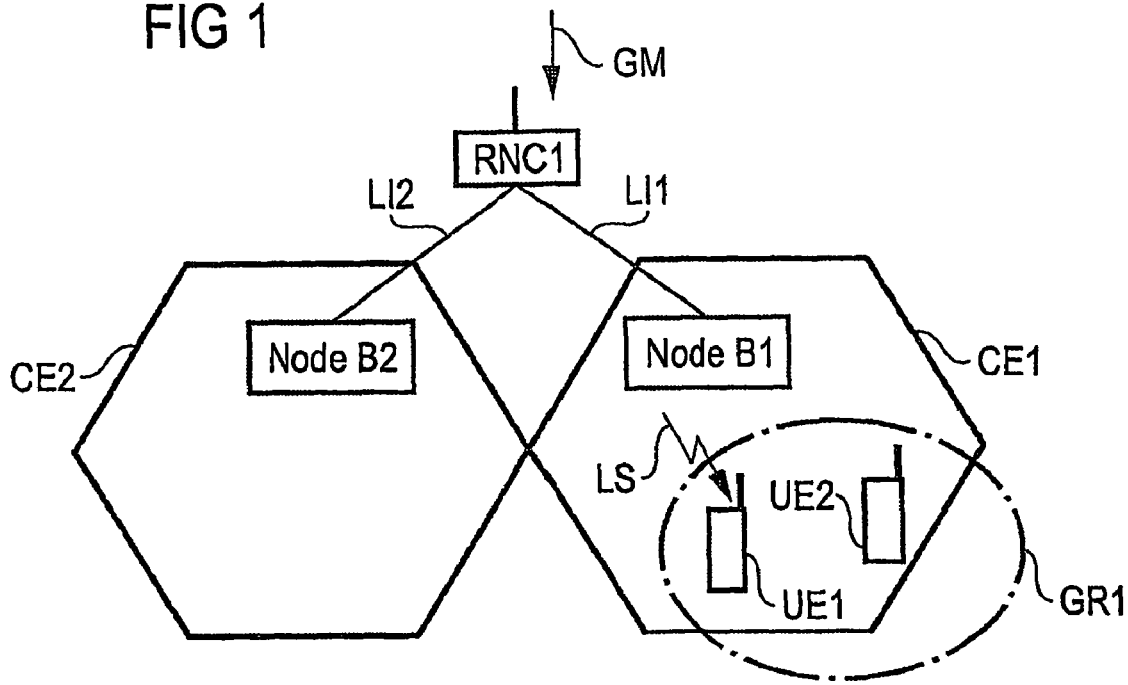

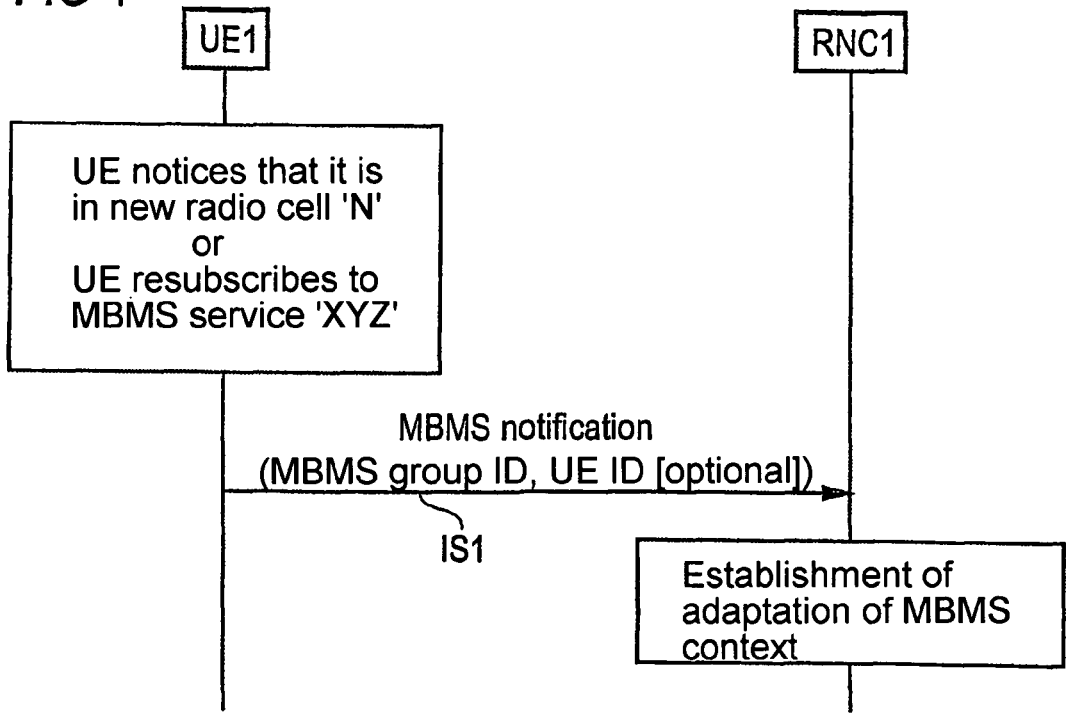
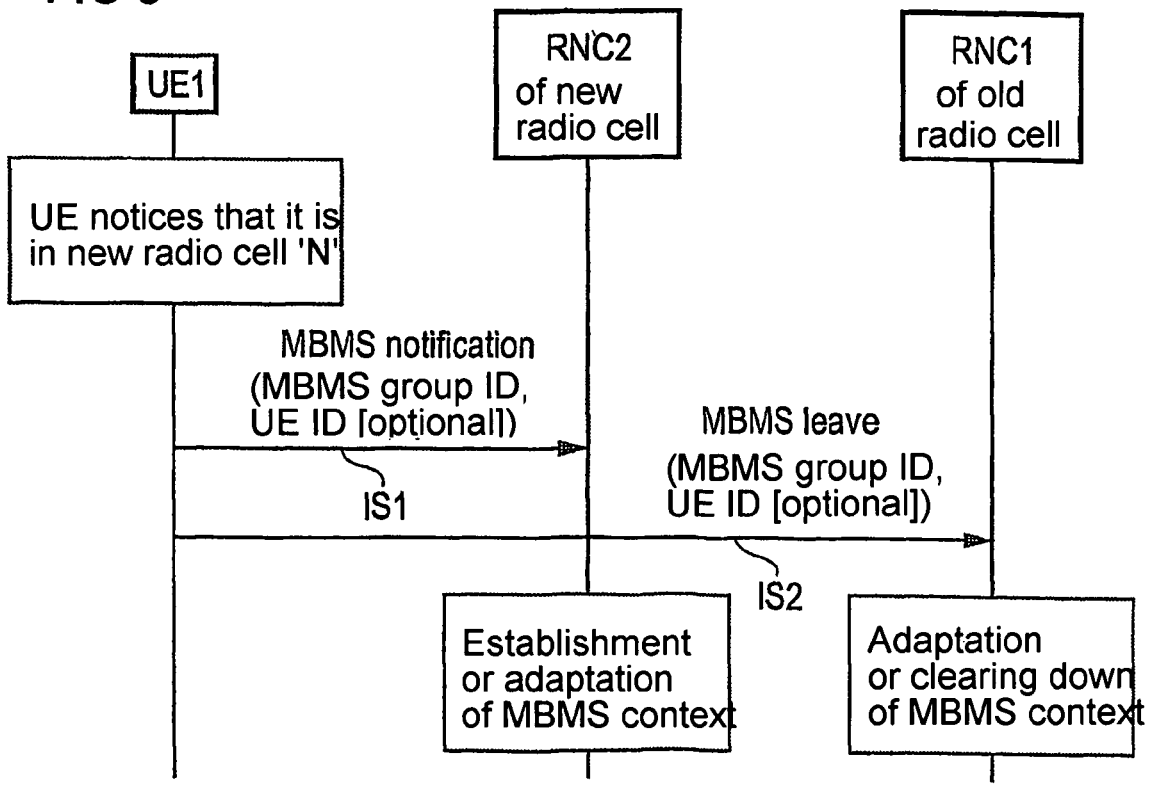

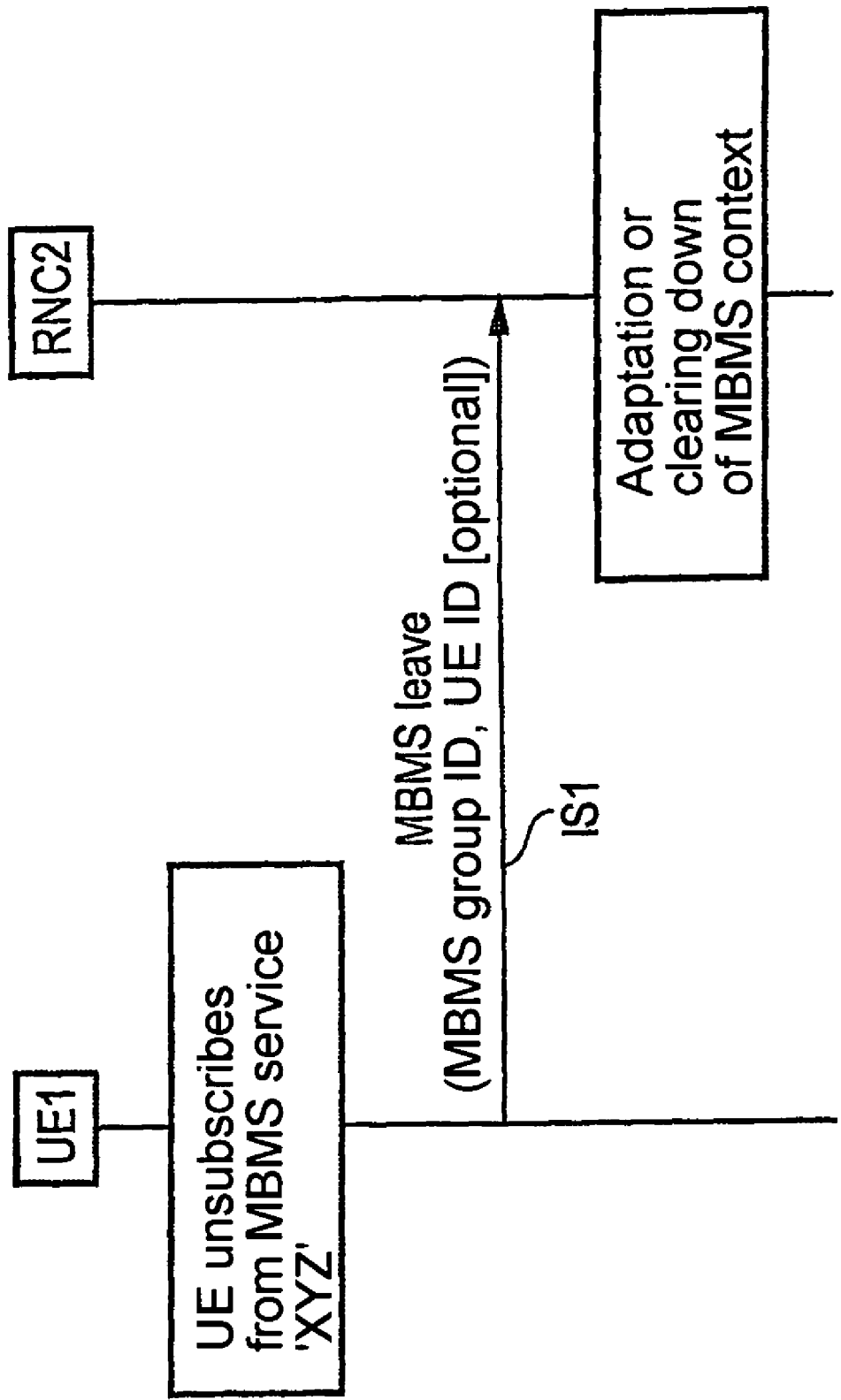

METHOD FOR TRANSMITTING AT LEAST ONE GROUP MESSAGE, ASSOCIATED RADIO COMMUNICATION NETWORK, SUBSYSTEM AND MOBILE COMMUNICATION DEVICE

BACKGROUND OF THE INVENTION

WO 98/35422 discloses a method and device, wherein group messages are transmitted in a packet-oriented radio network having at least one support node, a number of group users, and at least one defined area.

U.S. Pat. No. 5,640,443 discloses a mobile telephone system which performs telephone communication with a group consisting of mobile subscribers in order to improve the rate of completion of incoming calls and communication quality, wherein the group of mobile subscribers each send information including location number and subscriber number.

The present invention is directed toward a method of transmitting at least one group message as effectively as possible to one or more subscriber devices of at least one group in a radio communication network. The present invention is further directed toward an associated radio communication network, subsystem and mobile communication device.

SUMMARY OF THE INVENTION

Specifically, the present invention provides for a method for transmitting at least one group message to at least one group of one or more subscriber devices and at least one radio cell of the radio communication network, the base station of each radio cell being controlled by at least one higher-order radio network controller, wherein the higher-order radio network controller monitors how many subscriber devices in each radio cell are currently subscribed to the respective group, wherein at least one information signal indicating to the higher-order radio network controller whether a respective subscriber device is currently subscribed to the respective group is transmitted by the respective subscriber device via an air interface of the base station of its present location radio cell to the higher-order radio network controller, with the respective user ID not being added to the information signal, and wherein at least one further information signal indicating to the higher-order radio network controller whether the respective subscriber device can be unsubscribed from the respective group, is leaving its present location radio cell and/or is switching off, is transmitted by the respective subscriber device via the air interface of the base station of its present location radio cell to the higher-order radio network controller, with the user ID again not being added to the further information signal.

The present invention also provides for, in connection with the above-described method, an associated radio communication network, associated subsystem of the radio communication network and an associated mobile communication device.

Additional features and advantages of the present invention are described in, and will be apparent from, the following Detailed Description of the Invention and the Figures.

BRIEF DESCRIPTION OF THE FIGURES

FIG. 1 schematically illustrates networks elements and their interconnection in the UTRAN subsystem of UMTS (Universal Mobile Telecommunication System).

FIGS. 2, 3 each schematically illustrate an MBMS context in the UTRAN subsystem of FIG. 1 which is administered according to the inventive method by at least one higher-order radio network controller of the subsystem.

FIGS. 4 through 6 each schematically illustrate the signaling on the air interface between the relevant subscriber device and the higher-order radio network controller in the UTRAN subsystem of UMTS according to FIG. 1 for implementing the method according to the present invention.

DETAILED DESCRIPTION OF THE INVENTION

Elements with identical function and mode of operation are denoted by the same reference characters in FIGS. 1 through 6.

In many services and applications provided in modern mobile communication systems, messages are to be transmitted not to a single, but to two or more mobile communication subscribers of at least one predefined group. Examples of such services and applications are newsgroups, videoconferencing, video-on-demand, distributed applications, etc.

For transmitting the messages to the various subscribers it is possible to send a copy of the data to each recipient separately. Although this technique is easy to implement, it is unsuitable for large groups. As the same message is transmitted via N (N=number of message recipients) individual connections (unicast connections) and is multiply sent via common connection paths, this method requires a very high bandwidth.

A better option is provided by so-called multicast transmission. In this case, the various subscribers to which the same message is to be transmitted are combined to form a group (multicast group), with this group being assigned an address (multicast address). The data to be transmitted is then sent to this multicast address only once. Ideally, the multicast (=MC) message is sent only once via common transmission paths from the sender to the recipients. It is not necessary for the sender to know where and how many recipients are concealed behind the relevant multicast address. In order to be able to receive messages of a particular multicast group, a subscriber must be subscribed to the multicast group.

With broadcast, communications are sent to a group of subscribers within a geographical area. The area to which the broadcast messages are sent out is known as the broadcast area. The size of the broadcast area is determined by the network operator, the message ideally being transmitted only once via common connection paths, as in the case of multicast. The disadvantage of this method, however, is that all the subscribers within the broadcast area are able to read broadcast messages, even if they are not authorized. In order to read particular messages only and discard or filter others, subscribers can make appropriate settings on their terminals. Explicit subscription to a broadcast service is not required.

The so-called Multimedia Broadcast and Multicast Service (MBMS) is described in the specifications of the third generation of mobile radio systems, particularly for UMTS (Universal Mobile Telecommunication System). MBMS enables multimedia data to be transmitted via multicast and via broadcast.

Only the network elements of the UMTS access network, the so-called UMTS Terrestrial Radio Access Network (UTRAN), as a subsystem of the UMTS network will be considered in further detail below. By way of example, FIG. 1 schematically illustrates the following components of the network elements and their interconnection:

NodeB:

A NodeB (base station), here, the two base stations NodeB1, NodeB2, is a network component serving one or more radio cells via at least one air interface. The relevant NodeB is used for communication via at least one air interface between the fixed network part or higher-order mobile network part of the UMTS and the subscriber devices, particularly mobile radio devices, which are located in the radio cell around the base station.

Radio Network Controller (Abbreviation: RNC):

An RNC controls the resources of the air interface and supplies and controls one or more base stations (NodeBs).

Subscriber Device (UE):

The UE is, in particular, a mobile terminal which is connected to the UTRAN via the air interface.

In FIG. 1, for example, the two base stations NodeB 1, NodeB2 and their associated radio cells CE1, CE2 are controlled by the higher-order radio network controller RNC1, the base station NodeB1 and the base station NodeB2 being connected to the jointly assigned radio network controller RNC1 via the fixed lines LI1 and LI2, respectively. The radio cell CE1 of the base station NodeB1 contains the three subscriber devices UE1, UE2, UE3 which are subscribed and logged onto the group GR1, and communicate with the base station NodeB1 via the air interface LS1 and the controller RNC1 connected thereto.

The MBMS specifications lay down that the data of an MBMS service only shall be sent out in the radio cells in which the subscriber devices or UEs wishing to receive such service are also located. In order to be able to implement this, the UTRAN, in particular the RNC, requires knowledge or information as to whether subscribers or UEs wishing to receive a particular MBMS service are located in one of the radio cells for which the RNC is responsible. According to the prior art, the UTRAN, in particular the RNC, does not have this information. It is, in addition, established that a subscriber device (=UE) also shall be able to receive MBMS in so-called "idle mode." In this state (idle mode), the UTRAN has no knowledge concerning the UE; i.e., it does not even know that it is in one of its radio cells at all.

According to the prior art, the UTRAN is therefore unable to make a decision as to whether MBMS data shall be transmitted in radio cells, even if UEs wishing to receive the service are located there.

For this exemplary embodiment, a radio cell (cell ID=N; cell ID=cell identity) such as CE1 will be considered which is supplied by a NodeB (e.g., NodeB1, and an RNC, e.g., RNC1). In addition, an MBMS service (MBMS group ID=XYZ) will be considered.

Firstly, it will be shown, on the basis of two examples, how an MBMS context can be implemented and introduced advantageously in the UTRAN; in particular, in the RNC.

EXAMPLE 1

In the radio cell CE1 with cell ID "N=1" there is 1 (one) subscriber with UE ID "A" (this information element is optional) wishing to receive the MBMS service having MBMS service ID "XYZ." This MBMS context is illustrated, by way of example, in FIG. 2.

EXAMPLE 2

Let it be assumed that in the radio cell CE1 with cell ID "N=1" there are now 3 UEs UE1, UE2, UE3 having UE IDs "A", "B" and "C" (this information element is optional) wishing to receive the MBMS service having MBMS service ID "XYZ." This MBMS context is illustrated by way of example in FIG. 3.

When there are no subscribers wishing to receive the MBMS service in question in the radio cell CE1 in question, no MBMS context is administered or maintained in the RNC for the MBMS service in the radio cell.

Secondly, there now will be shown the form taken by advantageous signaling between UE and RNC, on the basis of which the MBMS context is established, adapted and/or removed in the RNC.

It will be assumed that there is still no UE wishing to receive the MBMS service "XYZ" in the radio cell in question; e.g., CE1. No MBMS context is therefore maintained in the RNC for the MBMS service and the radio cell, it being further assumed that a UE such as UE1 with UE ID "A" changes over to the radio cell CE1 in question with cell ID "N=1" and is already subscribed to the MBMS service in question with MBMS service ID "XYZ." On the basis of measurements, the UE=UE1 now detects that it is in a new cell. According to the present invention, the subscriber device UE1 now sends an information signal IS1 ("MBMS notification") to the higher-order radio network controller (=RNC) RNC1. This MBMS notification contains the MBMS group ID to which the subscriber device UE1 is subscribed (e.g., the TMGI (="temporary mobile group identifier") and optionally information about its identity (UE ID).

The RNC, here RNC1, now establishes the MBMS context according to the present invention. In this case, this is comparable to the above Example 1. The same "MBMS notification" IS1 is also sent by the subscriber device (=UE) to the RNC if the UE is already in the radio cell in question and re-subscribes to the MBMS service in question; i.e., registers and is therefore "on line" (or actively connected). This signaling scenario is shown in FIG. 4.

The information signal IS1 ("MBMS notification") is now transmitted to the higher-order radio network controller, in this case RNC1, by each UE which changes over to the radio cell in question and is subscribed to the MBMS service in question, and for each UE that is already in the radio cell in question and subscribes to the MBMS service in question. The MBMS context in the RNC for this radio cell and this MBMS service is then adapted accordingly.

If required, notification or information elements of this kind, such as MBMS group ID and UE-ID also may be incorporated in messages already present according the prior art and sent to the relevant RNC.

If a UE leaves the radio cell in question, it suitably re-transmits in the new radio cell an MBMS notification (e.g., IS1), to the RNC responsible (e.g., RNC1), which then administers or maintains a corresponding MBMS context for the new radio cell and the MBMS service. In addition to or independently from this, this radio-cell-changing UE suitably transmits in the old radio cell (i.e., in the radio cell which the UE is just leaving), another information signal (e.g., IS2 ("MBMS leave")), that is a notification or message, to the relevant RNC so that the latter knows that one less UE wishing to receive the MBMS service in question is now in the radio cell in question. The "MBMS leave message" usefully contains the information elements MBMS group ID (e.g., the TMGI) and optionally the UE-ID of the subscriber device (=UE) sending the "MBMS leave message." The RNC then usefully adapts the MBMS context for that radio cell and that MBMS service accordingly. This signaling scenario is shown in FIG. 5 where the information or notification signal of the "MBMS leave message" transmitted by the subscriber device UE1 to the relevant higher-order radio network controller RNC1 on leaving the radio cell CE1 is denoted by IS2.

This "MBMS leave message" IS2 also is usefully transmitted if the UE remains in the radio cell in question and unsubscribes from the MBMS service. This signaling scenario is shown in FIG. 6.

If required, the information elements such as MBMS group ID and UE-ID also may be incorporated in messages already provided according the prior art and sent to the RNC.

If the last UE wishing to receive data on the relevant MBMS service has left the radio cell in question or has unsubscribed from the relevant MBMS service and sent a corresponding "MBMS leave message" to the RNC, the latter clears down or deletes the MBMS context for that radio cell and that MBMS service.

In general terms, an MBMS context is preferably introduced in the UTRAN which describes for each radio cell whether or not how many subscribers have subscribed to an MBMS group (e.g., described by an MBMS group identity). The MBMS context is maintained, administered and modified in the UTRAN; in particular, the RNC. The MBMS context enables the UTRAN to know whether and how many UEs subscribed to a particular MBMS service are in the radio cells administered by it. On the basis of this information, the UTRAN subsystem, in particular the RNC, can decide whether or not MBMS data will be sent to a radio cell. Moreover, the UTRAN can, if necessary, decide on the basis of the MBMS context, in the case of a small number of subscribers, whether point-to-point transmission (each subscriber receives his/her data via connections assigned to him/her) or point-to-multipoint transmission (the subscribers receive their data via a common connection) is to be carried out.

Optionally, the MBMS context in the UTRAN additionally contains information as to which UEs (in particular, which UE identities) are in an MBMS group. This information can be used, for example, if the UTRAN decides in the case of a small number of recipients to use point-to-point transmission for transmitting MBMS data. The UE identities are then used for setting up the subscriber-specific point-to-point connections.

The MBMS-service-specific and radio-cell-specific MBMS context is preferably established in the relevant higher-order radio network controller responsible as soon as the first UE in the radio cell wishes to receive an MBMS service. There the MBMS context is modified or adapted in the controller as soon as new subscriber devices (UEs) wishing to receive the same MBMS service are in the radio cell or if UEs leave the radio cell or no longer wish to receive the service. The MBMS context is usefully cleared down as soon as there is no longer a UE wishing to receive the specific MBMS service in the radio cell.

As soon as a new UE is in a radio cell, it sends a notification (hereinafter, referred to as an "MBMS notification"), to the UTRAN, in particular to the RNC. This MBMS notification preferably contains at least the MBMS group identity (e.g., the TMGI (Temporary Mobile Group Identity)) or a number of identities (if UE is subscribed to a number of MBMS services) uniquely identifying an MBMS service. Optionally, the "MBMS notification" additionally may contain the UE identity of the UE that has sent the message.

The relevant UE sends the "MBMS notification" to the higher-order radio network controller (RNC) responsible, particularly if it:
is in a radio cell and subscribes to a new MBMS service, and/or
moves from one radio cell to a new radio cell, the UE detecting for example, on the basis of messages that it is in a new radio cell and automatically sending an MBMS notification to the UTRAN.

In order for the UTRAN to adapt to the MBMS context if UEs leave the radio cell, turn off, and/or unsubscribe from the MBMS service in question, the relevant UE in these cases usefully sends a message to the UTRAN so that the UTRAN knows that there is now one less UE in that radio cell. When the "old" radio cell is left, a message is therefore sent in the "old" cell to the "old" base station with its assigned controller to inform it that there is now one less UE present, and a message is sent in the "new" cell to the "new" base station with its assigned controller to inform it of the presence of one more UE wishing to receive a particular MBMS service. Within the scope of the present invention, this message is designated "MBMS leave message." This "MBMS leave message" preferably contains the MBMS group identity (e.g., the TMGI (Temporary Mobile Group Identity)) or if required a number of identities (if the relevant UE is subscribed to a number of MBMS services) which uniquely identify an MBMS service. Optionally, the "MBMS leave message" additionally may contain the UE identity of the UE that has sent the message.

Within the scope of the present invention, the following abbreviations and terms have been employed which have been introduced as standard or are widely used particularly in mobile communications as acronyms and in some cases definitions:

| | |
|---|---|
| ID | Identity (e.g. UE ID uniquely describes a UE) |
| MBMS | Multimedia Broadcast/Multicast Service |
| NodeB | Base station in the UMTS |
| RNC | Radio network controller |
| TMGI | Temporary Mobile Group ID (uniquely identifies the MBMS group) |
| UE | Subscriber device (mobile radio device in the UMTS network) |
| UMTS | Universal Mobile Telecommunication System |
| UTRAN | UMTS Terrestrial Radio Access Network |

In this way, there is provided a subsystem for a radio communication network for transmitting at least one group message to at least one receiving subscriber device. This subsystem of the radio communication network is formed by at least one subscriber device and at least one higher-order radio network controller which are implemented to carry out the method according to the present invention.

Although the present invention has been described with reference to specific embodiments, those of skill in the art will recognize the changes may be made thereto without departing from the spirit and scope of the present invention as set forth in the hereafter appended claims.

The invention claimed is:

1. A method for transmitting at least one group message to at least one group of one or more subscriber devices in at least one radio cell of a radio communication network, a base station of each radio cell being controlled by at least one higher-order radio network controller, the method comprising:
monitoring, via at least one higher-order radio network controller, how many subscriber devices in each radio cell are currently subscribed to the respective group; and
transmitting to the at least one higher-order radio network controller, by a respective subscriber device via an air interface of the base station associated with a current location radio cell of the respective subscriber device, at least one information signal indicating to the at least one higher-order radio network controller whether the respective subscriber device is currently subscribed to the respective group, with a user ID of the respective subscriber device not being added to the at least one information signal.

2. A method for transmitting at least one group message to at least one group of one or more subscriber devices as claimed in claim 1, wherein the method further comprises transmitting to the at least one higher-order radio network controller, by the respective subscriber device via the air interface of the base station associated with the current location radio cell, at least one further information signal indicating to the at least one higher-order radio network controller whether the respective subscriber device at least one of can be unsubscribed from the respective group, is leaving the current location radio cell and is switching off, with the user ID of the respective subscriber device not being added to the at least one further information signal.

3. A method for transmitting at least one group message to at least one group of one or more subscriber devices as claimed in claim 1, wherein the user ID of the respective subscriber device is added to the at least one information signal and the at least one further information signal.

4. A method for transmitting at least one group message to at least one group of one or more subscriber devices as claimed in claim 1, wherein the at least one information signal and the at least one further information signal are generated by a UMTS for a multicast transmission.

5. A method for transmitting at least one group message to at least one group of one or more subscriber devices as claimed in claim 1, wherein the respective subscriber device is a mobile communication device.

6. A radio communication network for transmitting at least one group message to at least one group of one or more subscriber devices in at least one radio cell of the radio communication network, comprising:
one or more subscriber devices;
a respective base station for each radio cell in the radio communication network; and
at least one higher-order radio network controller for controlling the base stations;
wherein the at least one higher-order radio network controller monitors how many subscriber devices in each radio cell are currently subscribed to a respective group, and wherein at least one information signal indicating to at least one higher-order radio network controller whether a respective subscriber device is currently subscribed to the respective group is transmitted by the respective subscriber device via an air interface of the base station associated with a current location radio cell of the respective subscriber device to the at least one higher-order radio network controller, with a user ID of the respective subscriber device not being added to the at least the one information signal.

7. A radio communication network as claimed in claim 6, wherein at least one further information signal indicating to the at least one higher-order radio network controller whether the respective subscriber device at least one of can be unsubscribed from the respective group, is leaving the current location radio cell of the respective subscriber device, and is switching off, is transmitted by the respective subscriber device via the air interface of the base station of the current location radio cell of the respective subscriber device to the at least one higher-order radio network controller, with the user ID of the respective subscriber device not being added to the at least one further information signal.

8. A subsystem of a radio communication network for transmitting at least one group message to at least one group of one or more subscriber devices in at least one radio cell of the radio communication network, the radio communication network including a respective base station for each radio cell of the radio communication network, comprising:
one or more subscriber devices; and
at least one higher-order radio network controller for controlling the base stations;
wherein the at least one higher-order radio network controller monitors how many subscriber devices in each radio cell are currently subscribed to a respective group, and wherein at least one information signal indicating to the at least one higher-order radio network controller whether a respective subscriber device is currently subscribed to the respective group is transmitted by the respective subscriber device via an air interface of the base station associated with a current location radio cell of the respective subscriber device to the at least one higher-order radio network controller, with a user ID of the respective subscriber device not being added to the at least one information signal.

9. A subsystem of a radio communication network as claimed in claim 8, wherein at least one further information signal indicating to the at least one higher-order radio network controller whether the respective subscriber device at least one of can be unsubscribed from the respective group, is leaving the current location radio cell of the respective subscriber device, and is switching off, is transmitted by the respective subscriber device via the air interface of the base station of the current location radio cell of the respective subscriber device to the at least one higher-order radio network controller, with the user ID of the respective subscriber device not being added to the at least one further information signal.

10. A radio communication device for receiving at least one group message transmitted to at least one group of one or more subscriber devices in at least one radio cell of a radio communication network, with a base station of each radio cell being controlled by at least one higher-order radio network controller which monitors how many subscriber devices in each radio cell are currently subscribed to a respective group, comprising parts for transmitting to the at least one higher-order radio network controller, via an air interface of the base station associated with a current location radio cell of the radio communication device, at least one information signal indicating to the at least one higher-order radio controller whether the radio communication device is currently subscribed to the respective group, with a user ID of the radio communication device not being added to the at least one information signal.

11. A radio communication device as claimed in claim 10, further comprising parts for transmitting to the at least one higher-order radio network controller, via the air interface of the base station associated with the current location radio cell of the radio communication device, at least one further information signal indicating to the at least one higher-order radio network controller whether the radio communication device at least one of can be unsubscribed from the respective group, is leaving the current location radio cell of the radio communication device, and is switching off, with the user ID of the radio communication device not being added to the at least one further information signal.

12. A radio communication device as claimed in claim 10, wherein the radio communication device is a mobile communication device.

* * * * *